United States Patent
Egan et al.

(10) Patent No.: US 9,129,037 B2
(45) Date of Patent: *Sep. 8, 2015

(54) DISAPPEARING INDEX FOR MORE EFFICIENT PROCESSING OF A DATABASE QUERY

(71) Applicant: International Business Machines Corporation, Armonk, NY (US)

(72) Inventors: Randy L. Egan, Rochester, MN (US); Roger A. Mittelstadt, Byron, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/769,797

(22) Filed: Feb. 18, 2013

(65) Prior Publication Data
US 2013/0159316 A1 Jun. 20, 2013

Related U.S. Application Data (62) Division of application No. 12/944,505, filed on Nov. 11, 2010.

(51) Int. Cl.
*G06F 17/30* (2006.01)

(52) U.S. Cl.
CPC ...... *G06F 17/30946* (2013.01); *G06F 17/3033* (2013.01); *G06F 17/30442* (2013.01)

(58) Field of Classification Search
CPC .................. G06F 17/30946; G06F 17/30324
See application file for complete search history.

(56) References Cited

U.S. PATENT DOCUMENTS

| | | | |
|---|---|---|---|
| 6,122,626 A | 9/2000 | Brandsma | |
| 7,191,174 B2 | 3/2007 | Day et al. | |
| 7,440,935 B2 | 10/2008 | Day et al. | |
| 7,630,958 B2 | 12/2009 | Day et al. | |
| 7,685,101 B2 | 3/2010 | Day et al. | |
| 2002/0049753 A1* | 4/2002 | Burrows | 707/3 |
| 2003/0135495 A1 | 7/2003 | Vagnozzi | |
| 2004/0236727 A1 | 11/2004 | Day et al. | |
| 2005/0154710 A1* | 7/2005 | Ruhlow et al. | 707/3 |
| 2008/0091642 A1* | 4/2008 | Bestgen et al. | 707/2 |
| 2009/0182720 A1 | 7/2009 | Cain et al. | |
| 2011/0270871 A1 | 11/2011 | He et al. | |

\* cited by examiner

*Primary Examiner* — Syed Hasan
(74) *Attorney, Agent, or Firm* — Martin & Associates, LLC; Bret J. Petersen (57) ABSTRACT

A disappearing index allows faster processing of a database query without the startup time of a prior art sparse index. The disappearing index starts as a full index but is trimmed of index values that point to a row in the table that is not selected by the query. Thus the traditional index disappears as it becomes a sparse index tailored to the query. The query is able to execute faster using the now sparse index since the target database table is not accessed for duplicate values in the base table of the query. The query optimizer may determine to use a disappearing index based on estimates of the number of duplicate values in the base table. When the query is complete, the created disappearing table may be discarded or used for other queries that match the selection of the query that created the disappearing index.

6 Claims, 5 Drawing Sheets

DISAPPEARING INDEX FOR MORE EFFICIENT PROCESSING OF A DATABASE QUERY

BACKGROUND

1. Technical Field

This disclosure generally relates to computer database systems, and more specifically relates to a disappearing index for more efficient processing of a database query on a computer database.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result, which is also known as a "result set".

A database management system typically includes a query optimizer that attempts to optimize the performance of a query. The query optimizer selects from multiple query access plans to execute the query with the greatest efficiency. The query optimizer typically creates an access plan to execute the query. The access plan may use an index to access a database table. An index is an auxiliary data structure that is keyed to one or more columns of data in a database table to quickly access data in the table. However, even with an index a complex query to a large database can take a significant amount of resources to process the query.

In the prior art, the database query optimizer was forced to determine whether to use an existing index, or to create a temporary sparse index where the selection of the query is built into the temporary sparse index. There is a trade off between using an existing index versus a temporary sparse index. The existing index has no start up time to use it, but using the existing index may result in long fetch times because extra I/Os on a table object typically must be performed to determine which records to discard and which to return to the user. Conversely, the temporary sparse index has a start up cost to build, but once built, the fetch time will be faster. The fetch time is faster for a sparse index because every record processed in the temporary index is one of interest, and thus no time is wasted going to the table object for records that will be discarded immediately.

BRIEF SUMMARY

The disclosure and claims herein are directed to a disappearing index for faster processing of a database query without the startup time of a prior art sparse index. The disappearing index starts as a full index but is trimmed of index values that point to a row or record in the table that is not selected by the query. Thus the traditional index disappears as it becomes a sparse index tailored to the query. The query is able to execute faster using the now sparse index since the target database table is not accessed for duplicate values in a table of the query. The query optimizer may determine to use a disappearing index based on estimates of the number of duplicate values in a table in a query. When the query is complete, the created disappearing index may be discarded or used for other queries that match the selection of the query that created the disappearing index.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

1.0 Overview

The present invention relates to processing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, and salary. With data stored in this format, a query could be formulated that would retrieve the records for all employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. A sample SQL query is as follows:

Select*from Table1 where $C1=4$ AND($C2>6$ or $C3=8$)

The "select *" statement tells the database query processor to select all columns, the "from Table1" statement identifies which database table to search, and the "where" clause specifies one or more expressions that must be satisfied for a record to be retrieved. Note that the query above is expressed in terms of columns C1, C2 and C3. Information about the internal storage of the data is not required as long as the query is written in terms of expressions that relate to values in columns from tables. For the query above, the "where" clause specifies that the first column has a value equal to four ($C1=4$) logically ANDed with the expression that the second column is greater than six OR the third column is equal to eight.

2.0 Detailed Description

The disclosure and claims herein are directed to a disappearing index for faster processing of a database query without the startup time of a prior art sparse index. The disappearing index starts as a full index but is trimmed of index values that point to a row or record in the table that is not selected by the query. Thus the traditional index disappears as it becomes a sparse index tailored to the query. The query is able to execute faster using the now sparse index since the target database table is not accessed for duplicate values in a table of the query. The query optimizer may determine to use a disappearing index based on estimates of the number of duplicate values in a table in a query. When the query is complete, the created disappearing index may be discarded or used for other queries that match the selection of the query that created the disappearing index.

Figure 1:
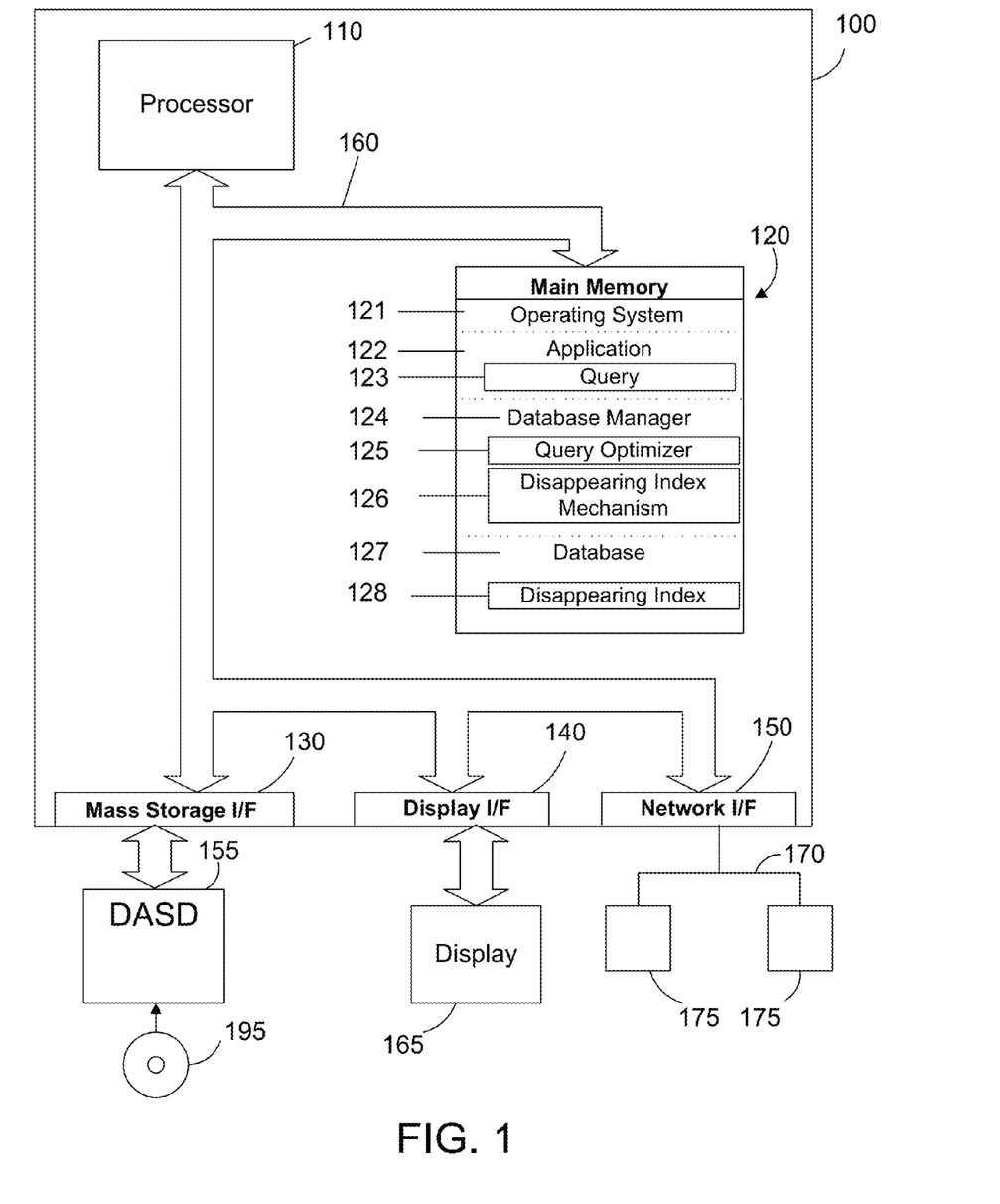
FIG. 1 is a block diagram of a computer system with a disappearing index mechanism that creates a disappearing index for a database query.

Referring to FIG. 1, a computer system 100 is one suitable implementation of a computer system that includes a disappearing index mechanism as described herein. Computer system 100 is an International Business Machines Corporation (IBM®) Power System which can run multiple operating systems including the IBM® i operating system. However, those skilled in the art will appreciate that the disclosure herein applies equally to any computer system capable of being connected in a multi-nodal or distributing computing environment. For example, the computer system 100 could also represent a single node of a massively parallel computer such as IBM® Corporation's Blue Gene® computer system, or a node of a scalable performance cluster such as a Beowulf cluster. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable or computer recordable medium, such as direct access storage devices 155, to computer system 100. One specific type of direct access storage device 155 is a readable and writable CD-RW drive, which may store data to and read data from a compact disk (CD) 195.

Main memory 120 preferably contains an operating system 121. Operating system 121 is a multitasking operating system known in the industry as IBM® i operating system; however, those skilled in the art will appreciate that the spirit and scope of this disclosure is not limited to any one operating system. The memory further includes a software application 122 that includes a query 123. The memory 120 includes a database manager 124 with a query optimizer 125 and a disappearing index mechanism 126 as described further below. The memory 120 further includes a database 127 with a disappearing index 128. These elements in the memory 120 may be located within the memory of a single computer system 100 as shown or may be on other computer systems and communicate with one another over one or more networks described below. Further, while these elements are shown to reside in memory 120, they may also be stored at one time or another on a non-volatile storage.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, query 123, database manager 124, query optimizer 125, disappearing index mechanism 126, database 127 and disappearing index 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the application 122 and the database manager(s) 124.

Although computer system 100 is shown to contain only a single processor and a single system bus, those skilled in the art will appreciate that a disappearing index mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
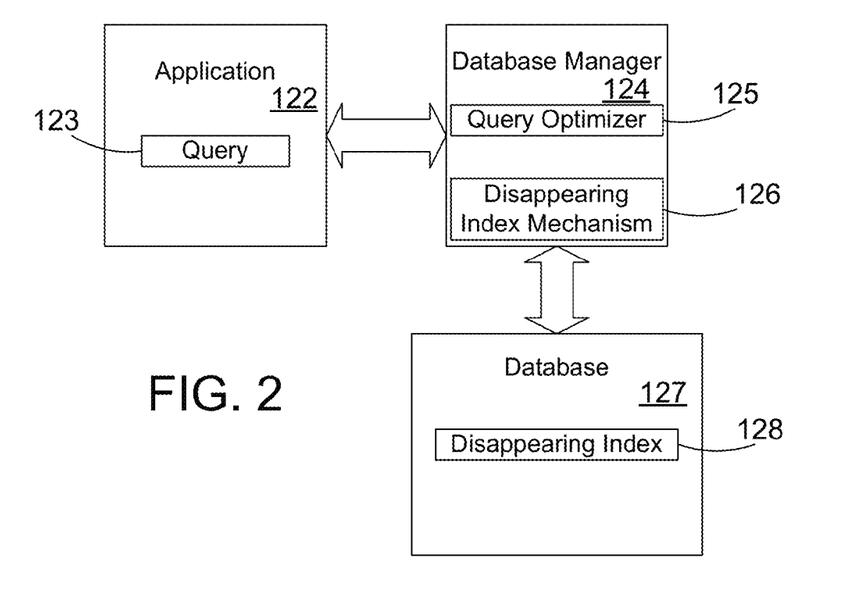
FIG. 2 is a block diagram that illustrates the interaction of the disappearing index with the other memory components in FIG. 1.

FIG. 2 is a block diagram that illustrates an example of a disappearing index 128 and how it interacts with the other memory components introduced above with reference to FIG. 1. In this example, a software application 122 has a query 123 that queries data in database 127. The query 123 is sent to the database manager 124. The database manager is a set of programs that control the creation, maintenance and use of a database. The database manager 124 includes a query optimizer 125 that attempts to determine the most efficient way to execute the query 123. The query optimizer 125 in the database manager 124 receives the query 123 and determines that the query is an appropriate candidate to use a disappearing index 128. The disappearing index mechanism 126 is thus invoked by the database manager 124 to execute the query using a disappearing index 128 as described herein. While the software application 122, the database 127 and the database manager 124 are shown as residing in the memory of a single computer, in a typical system they could reside on different computers.

The disappearing index mechanism 126 removes values from the disappearing index 128 that do not select a row or record for the query 123. Where there are multiple pointers for a value in the index, the disappearing index mechanism may also remove pointers to rows that are not selected, and then remove the value from the index if all the pointers point to rows that are not selected. The disappearing index mechanism processes the query with an initially full index and removes values from the index for query joins that do not select a row or a record. Similarly, the disappearing index mechanism could remove values of an index for a single file query operation to reduce accesses required by a subsequent run of the query to the single file. A single file query operation is a query access that uses a scan or probe of an index over a single file. Thus the disappearing index mechanism creates a sparse index while processing the query by removing values in the index for query joins or operations that do not select a row or record. Pointers are also removed if there are duplicate values. Removing pointers in this manner can reduce the accesses to the table for values that cannot be removed from the index.

The database manager 124 determines when to invoke the disappearing index mechanism 126 to use a disappearing index to execute the query. The query optimizer in the database manager may determine to use a disappearing index based on a number of criteria. Some examples are given below. The disappearing index begins as a full index and then becomes a sparse index as the disappearing index mechanism removes values from the index. A sparse index is a full index that has one or more values or pointers removed. When the query is complete, the created disappearing index or sparse index may be discarded or maintained to use for the same query again or used for other queries that match the selection of the query that created the disappearing index.

The query optimizer in the database manager may determine to use a disappearing index based on a number of criteria for improved efficiency of the database manager. For example, the database manager may determine so use a disappearing index based on estimates of the number of duplicate values in a table used in a query. Alternatively, the query optimizer may determine to use a disappearing index mechanism based on historical information about the database tables of the query. The determination may also be based on the frequency of a given query, the more it is run, the more beneficial to build a disappearing index so that future runs will have a prebuilt sparse index. Alternatively, the determination may be based on observing that many rows are rejected from the query. The database manager may also determine to change to use a disappearing index while processing a query (mid query) or determine to use a disappearing index the next time a query is run even if it initially did not determine to use one. Further, the database manager may determine to use a disappearing index based on selectivity estimates from a WHERE clause of a query, if the WHERE clause is very selective, then it may be a good query to process using a disappearing index.

Figure 3:
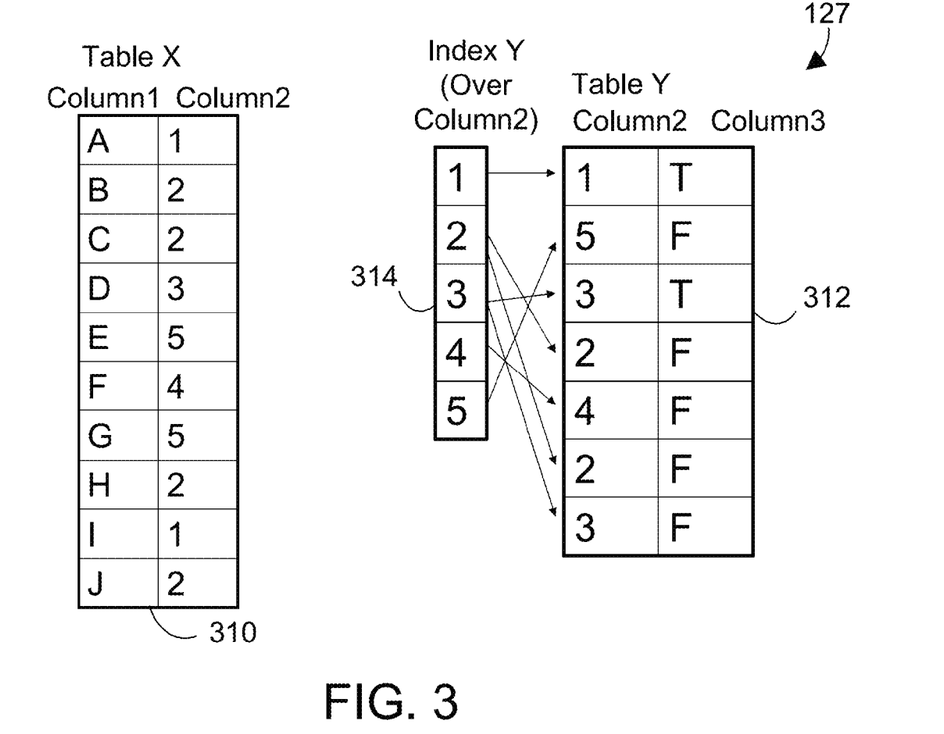
FIG. 3 is a block diagram that shows an example of a disappearing index.
Figure 4:
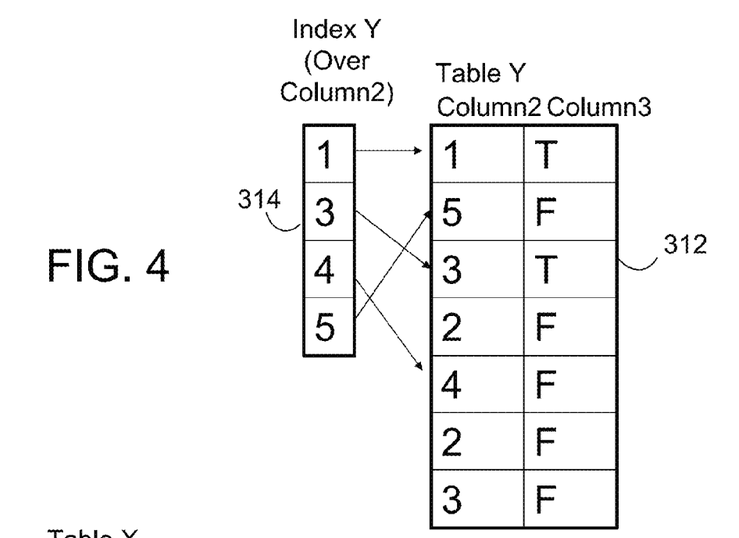
FIG. 4 is a block diagram that shows the disappearing index from the example in FIG. 3 being trimmed by the disappearing index mechanism.

FIG. 3 illustrates a block diagram that shows an example of a database 127 with a disappearing index (Y index 314). In this example we assume the following query is applied to Table X 310, Table Y 312 and Index Y 314 as shown in FIG. 3:

Select* from $X, Y$ Where $X.\text{column}2 = Y.\text{column}2$ and $Y.\text{column}3 = \text{'T'}$ Given this query and the database as shown in FIG. 3, the query optimizer determines to use a disappearing index and creates or uses the full index Y 314 over column2 as shown in FIG. 3. In the first join from X to Y, the first row from X (A) joins normally to Y thru the Y index 314 such that the first record is selected since Table X column 2 is equal to Table Y column 2 and Table Y column 3 is 'T'. For the second row in Table X 310, (B) in X tries to join in Y, the Y index 314 has a first pointer (or link) that points to a row in Y that has a 'F' in Column2, therefore this pointer is removed from the index. The second pointer is processed and determined that it also points to an 'F' so its pointer is also removed. Since all pointers of the index value '2' do not result in a record selected, the value '2' is discarded or removed from the index. The value '2' in Index Y 314 can be dropped from the index since we know that for all subsequent searches of the value '2', no value will be selected. The disappearing index, Index Y 314, is shown in FIG. 4 with the value '2' dropped from the index. Thus, where there are multiple pointers or values of '2' in the index, we drop the pointer to the row from the index, and once all pointers for a value are dropped, then we can drop the value from the index. The next value C in Table X is also a '2' but when it looks at Y's index, it does not find a '2' anymore so it stops that probe. Thus, subsequent processing of the query for a value of '2' does not touch table Y at all allowing the query to run faster.

Again referring to FIG. 3, the processing of the query continues by processing the value '3' in Table X, column2. When the query is applied to this value, there are two pointers from the value '3' in Index Y. The first pointer is to a 'T' so the row is selected and the '3' is not removed from the index. The second pointer is to a 'F' in Column3 so this pointer is removed. FIG. 4 illustrates that the second pointer for the value '3' in Index Y 314 has been removed and the value '3' retained in the index. The remainder of the query proceeds similarly.

Figure 5:
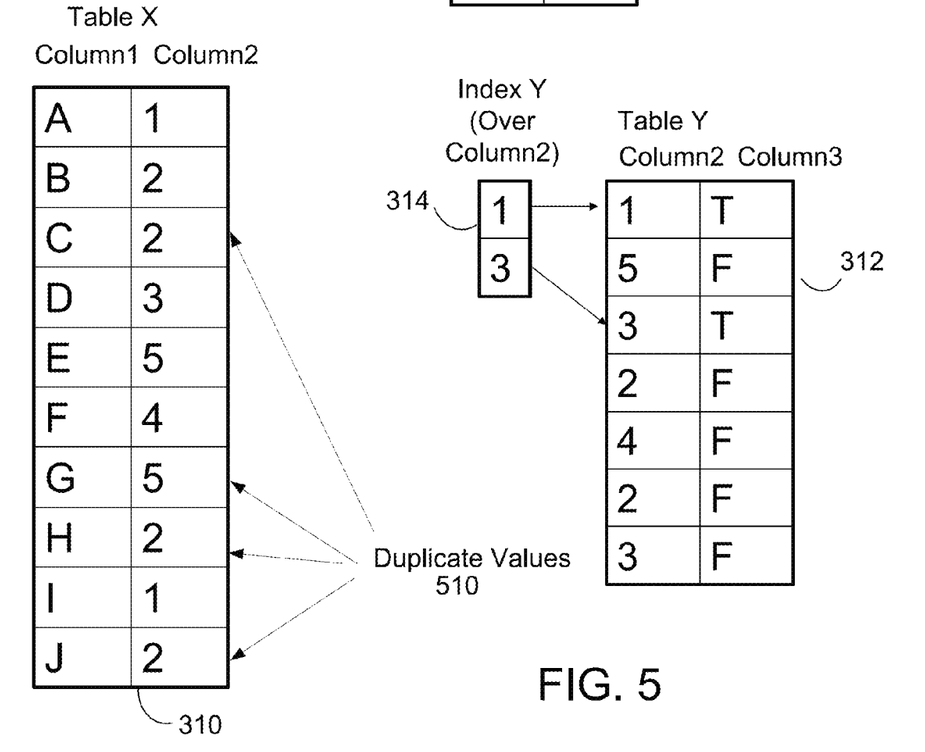
FIG. 5 is a block diagram that shows the disappearing index from the example in FIG. 4 again being trimmed by the disappearing index mechanism.

FIG. 5 illustrates the final state of disappearing Index Y 314 after processing each of the query joins. In the same manner described above, values 4 and 5 have also been dropped from Index Y 314 compared to the state of the index in FIG. 4. In this simple example, four accesses to table Y 312 are avoided by using the disappearing index 314 corresponding to the duplicate values 510 indicated in FIG. 5. Of course where a table has many rows with many duplicate values, the savings could be much larger.

Figure 6:
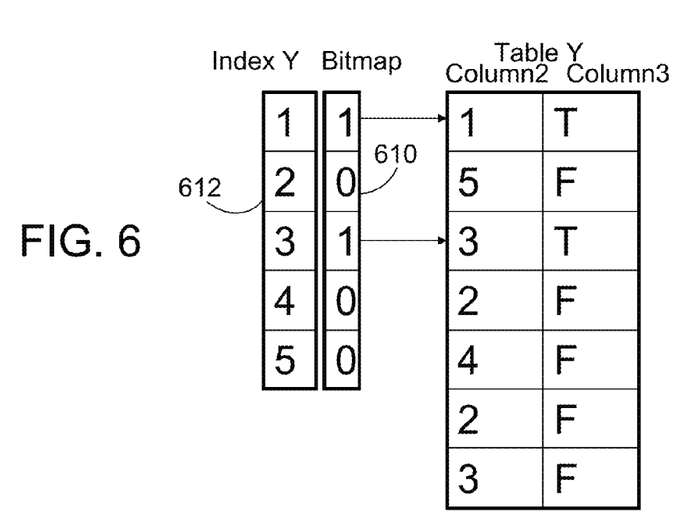
FIG. 6 is an example of a disappearing index with a bitmap.

FIG. 6 illustrates a block diagram that shows an example of a disappearing index with a corresponding bit map 610. In this example we assume the same query and tables as for the previous example. In this variation of the disappearing index, instead of modifying a full index to create a sparse index, a bitmap 610 is created with a bit corresponding to each element of Index Y 612. The bitmap is used as an index and the bitmap is modified to indicate the dropped index values. In the illustrated example, the bitmap 610 is initially filled with ones where a "1" in the bitmap indicates that corresponding value in the index is active. The operation of the query is similar to that described above. However, instead of dropping a value from the index, the Index Y "disappears" by changing the value of the corresponding bits of the bitmap (for example from a '1' to a '0'). FIG. 6 illustrates the state of the bitmap after the disappearing index mechanism has changed the bits after executing the above query. The bitmap 610 therefore reflects the same information as the disappearing index 314 as shown in FIG. 5.

Figure 7:
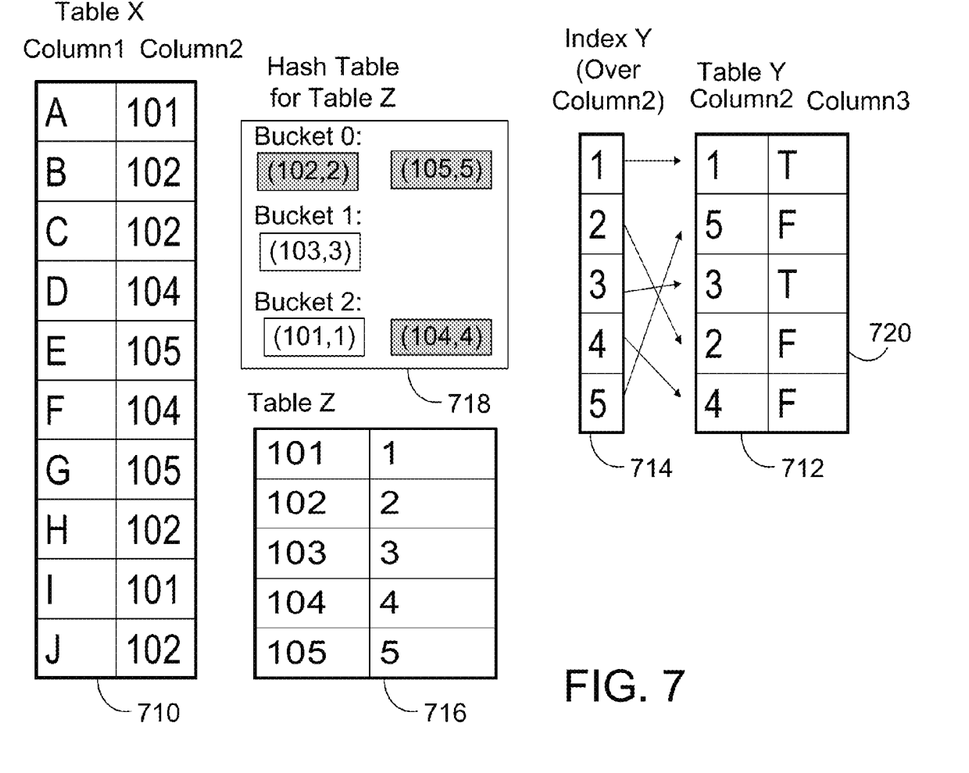
FIG. 7 is an example of a disappearing index using a hash table.

FIG. 7 illustrates a block diagram that shows an example of a disappearing index mechanism used in conjunction with a hash table. In this example we assume the following query is applied to Table X 710, Table Y 712 with Index Y 314, and Table Z 716 as shown in FIG. 3:

Select*from X,Z,Y Where X.column2=Z.Z1 And
Z.Z2=column2 And Y.column3='T'

In this example, the query optimizer has determined to build a hash table 718 for Table Z 716. A hash table is an index structure with sets of keys grouped into buckets. A modulus operator is used to group the keys from Table Z. In this example, Modulo 3 is applied to the value in Column2 of Table X 710. For the first value (101) in Column2 of Table X 710, modulo 3 applied to the value '101' (101/3=33 remainder 2) results in a remainder of 2. Thus the key (101,1) is placed in bucket 2 of hash table 718. Similarly the other keys of Table Z 716 are placed in the hash table 718. The disappearing index mechanism processes the query as described above using the hash table as an index for the above query. When a query value results in no row being selected, instead of removing the value from the Index Y 714, the disappearing index mechanism will simply remove the corresponding key from the hash table 718. So for the second value of Column2 in Table X 710, the row is not selected where Column3 in Table Y 712 has an 'F' 720 corresponding to the value '2'. So the disappearing index mechanism would remove the key (102,2) from the hash table 718. Similarly keys (105,5) and (104,4) would be removed. The keys removed by the disappearing index mechanism are indicated by the darkened keys in the hash table 718 in FIG. 7. Upon processing subsequent duplicate values, the removed keys will result in fewer accesses to Table Y for improved database performance and efficiency in the same manner as discussed above.

Figure 8:
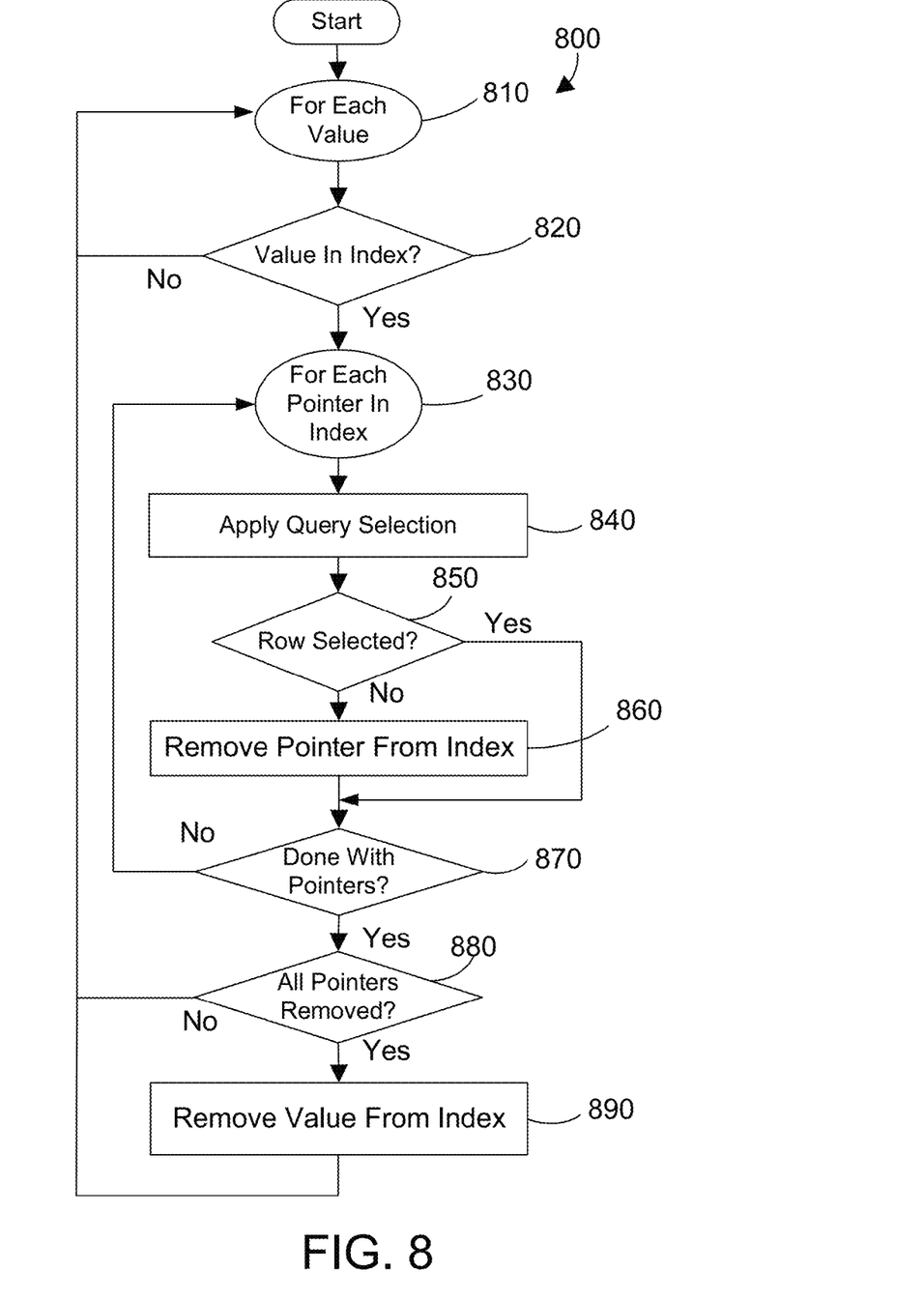
FIG. 8 is a method flow diagram for a disappearing index mechanism as claimed herein.

FIG. 8 shows a method 800 for using a disappearing index 128 to execute a query as claimed herein. The steps in method 800 are preferably performed by the disappearing index mechanism 126 (FIG. 1), but portions of the method may also be performed by other software associated with the computer system. The method looks at each value for the query join or single file query operation (step 810). The method first checks to see if the current value is in the index (step 820). If the value is in the index (step 820=yes) then each pointer for the value in the index is checked (step 830). The query is applied to the selected pointer (step 840) to see if the query makes a row selection from the target table (step 850). If a row is selected (step 850=yes) then go to step 870. If a row is not selected (step 850=no) then remove the pointer from the index (step 860). Then check if the method is done processing all the pointers for this value (step 870). If not done processing all the pointers (step 870=no) then go to step 830 for the next pointer. If we are done processing all the pointers (step 870=yes) then check if all the pointers for the value have been removed (step 880). If all the pointers for the current value have been removed (step 880=yes) then remove the value from the index (step 890) and return to step 810 for the next value. If all the pointers for the current value have not been removed (step 880=no) then return to step 810 for the next value. The method is then done when all the values have been processed.

In the method of FIG. 8, if there is only a single pointer for the values in the index, then the steps of the method 800 can be simplified to steps 810, 820, 840, 850 and 890. The method would then be summarized as follows. Process each value of a query join by performing the following steps for each value (step 810). If the value is not in the index (step 820=no), then go to the next value (step 810). If the value is in the index (step 820=yes), then apply the query selection to the value (step 840) and determine if a row is selected (step 850). If the row is not selected (step 850=no) then remove the value from the index (step 890) and go to the next value (step 810). If the row is selected (step 850=yes) then go to the next value (step 810). The method is then done when all the values have been processed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, a relocation mechanism dynamically relocates processing units (job) in a distributed computer system in a multi-nodal environment based on incoming physical data into a processing unit on a node. The relocation mechanism monitors physical data flowing into a processing unit and dynamically relocates the processing unit to another type of node within the 'cloud' of nodes based on the type of physical data or pattern of data flowing into the processing unit. The enables the multi-nodal system to maximize efficiency by having processing units that are processing a specific data type to be executed on a node of the preferred node for that data.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for processing a database query, the method comprising the steps of:
   processing each value of a query operation by performing the following steps to create a sparse index from an index that is initially full:
      if the value is not in the index, then process the next value;
      if the value is in the index, then apply a query selection to the value and determine if a row is selected;
      if no row is selected then remove the value from the index and go to the next value; and
      if the row is selected, then process the next value.

2. The method of claim 1 further comprising the steps of:
   processing each value for the query operation by performing the following steps for each pointer in the index corresponding to the value:
      if no row is selected for the pointer then remove the pointer from the index;
      if there is a row selected for the pointer, then go to the next pointer; and
      if all the pointers are removed from the index, then remove the value from the index.

3. The method of claim 1 wherein the step of removing the value from the index comprises changing a corresponding bit value in a bit map corresponding to the index for query operations that do not select a record.

4. The method of claim 1 wherein the step of removing values from the index comprises providing a hash table with keys grouped in buckets, and removing the keys from the buckets in the hash table for query operations that do not select a record.

5. The method of claim 1 wherein the step of removing values from the index comprises determining there are multiple pointers for a value in the index and removing pointers from values in the full index that point to a record that is not selected and removing the value from the index where all the pointers point to records that are not selected.

6. The method of claim 1 wherein the created sparse index is maintained to use again for queries of the database.

* * * * *